United States Patent
Okuyama et al.

(10) Patent No.: US 8,410,677 B2
(45) Date of Patent: Apr. 2, 2013

(54) BLUE PHOSPHOR, LIGHT-EMITTING DEVICE, AND PLASMA DISPLAY PANEL

(75) Inventors: Kojiro Okuyama, Nara (JP); Yayoi Kitamura, Osaka (JP); Seigo Shiraishi, Osaka (JP); Kazuhiko Sugimoto, Osaka (JP); Mituru Harada, Osaka (JP)

(73) Assignee: Panasonic Corporation, Osaka (JP)

( * ) Notice: Subject to any disclaimer, the term of this patent is extended or adjusted under 35 U.S.C. 154(b) by 647 days.

(21) Appl. No.: 12/595,159

(22) PCT Filed: Mar. 25, 2008

(86) PCT No.: PCT/JP2008/000722
§ 371 (c)(1),
(2), (4) Date: Oct. 8, 2009

(87) PCT Pub. No.: WO2008/136171
PCT Pub. Date: Nov. 13, 2008

(65) Prior Publication Data
US 2010/0052506 A1 Mar. 4, 2010

(30) Foreign Application Priority Data
Apr. 18, 2007 (JP) .................. 2007-109838

(51) Int. Cl.
C09K 11/55 (2006.01)
C09K 11/64 (2006.01)
(52) U.S. Cl. ........... 313/486; 252/301.4 R; 252/301.4 F; 252/301.5
(58) Field of Classification Search ........... 252/301.4 R, 252/301.4 F, 301.5; 313/483–486, 494, 582
See application file for complete search history.

(56) References Cited

U.S. PATENT DOCUMENTS

| 6,254,805 | B1 | 7/2001 | Potter | |
|---|---|---|---|---|
| 7,014,792 | B2 | 3/2006 | Raukas et al. | 252/301.4 R |
| 7,300,605 | B2 | 11/2007 | Fukuta et al. | |
| 8,040,063 | B2 | 10/2011 | Okuyama et al. | 313/582 |

(Continued)

FOREIGN PATENT DOCUMENTS

| CN | 101151347 | 3/2008 |
|---|---|---|
| JP | 3-177491 A | 8/1991 |

(Continued)

OTHER PUBLICATIONS

Jeong Ho Ryu, Jong-won Yoon, and Kwang Bo Shim, "Blue-Luminescence of Nanocrystalline MWO4 (M = Ca, Sr, Ba, Pb) Phosphors Synthesized via a Citrate Complex Route Assisted by Microwave Irradiation", Electrochemical and Solid-State Letters, 8 (5) D15-D18 (2005).*

(Continued)

*Primary Examiner* — Karabi Guharay
*Assistant Examiner* — Nathaniel Lee
(74) *Attorney, Agent, or Firm* — Hamre, Schumann, Mueller & Larson, P.C.

(57) ABSTRACT

The present invention provides a blue phosphor having high luminance and showing less luminance degradation during driving of a light-emitting device. The present invention is a blue phosphor that includes: an alkaline earth metal aluminate represented by a general formula $aBaO \cdot bSrO \cdot (1-a-b)EuO \cdot cMgO \cdot dAlO_{3/2}$, where $0.70 \leq a \leq 0.95$, $0 \leq b \leq 0.15$, $0.95 \leq c \leq 1.15$, $9.00 \leq d \leq 11.00$, and $a+b \leq 0.97$ are satisfied; and 0.008 mol to 0.800 mol of $MWO_4$ with respect to 1 mol of the aluminate, where M is at least one element selected from a group consisting of Ba, Sr, and Ca.

5 Claims, 1 Drawing Sheet

U.S. PATENT DOCUMENTS

| | | | |
|---|---|---|---|
| 2004/0066354 A1 | 4/2004 | Aoki et al. | 345/60 |
| 2005/0046330 A1 | 3/2005 | Okuyama et al. | 313/486 |
| 2005/0062417 A1* | 3/2005 | Okuyama et al. | 313/582 |
| 2006/0091360 A1* | 5/2006 | Hirayama et al. | 252/301.4 R |
| 2008/0203893 A1 | 8/2008 | Sakai et al. | |
| 2010/0237764 A1 | 9/2010 | Okuyama et al. | |
| 2010/0237765 A1 | 9/2010 | Okuyama et al. | |

FOREIGN PATENT DOCUMENTS

| | | |
|---|---|---|
| JP | 6-029418 B2 | 1/1994 |
| JP | 10-330746 A | 12/1998 |
| JP | 2000-026855 A | 1/2000 |
| JP | 2000-034478 A | 2/2000 |
| JP | 2000-169841 | 6/2000 |
| JP | 2002-080843 A | 3/2002 |
| JP | 2002080843 A * | 3/2002 |
| JP | 2003-082344 | 3/2003 |
| JP | 2003-147352 A | 5/2003 |
| JP | 2005-314464 A | 11/2005 |
| JP | 2005-340155 A | 12/2005 |
| JP | 2006-290974 A | 10/2006 |
| WO | WO 2004/087833 A | 10/2004 |
| WO | 2008/136170 | 11/2008 |
| WO | WO 2008/136170 | 11/2008 |

OTHER PUBLICATIONS

Co-pending U.S. Appl. No. 12/595,174, filed Oct. 8, 2009.

Ryu, et al., "Blue-Luminescence of Nanocrystalline $MWO_4$ (M = Ca, Sr, Ba, Pb) Phosphors Synthesized via a Citrate Complex Route Assisted by Microwave Irradiation", Electrochemical and Solid-State Letters, vol. 8, No. 5, 2005, pp. D15-D18.

* cited by examiner

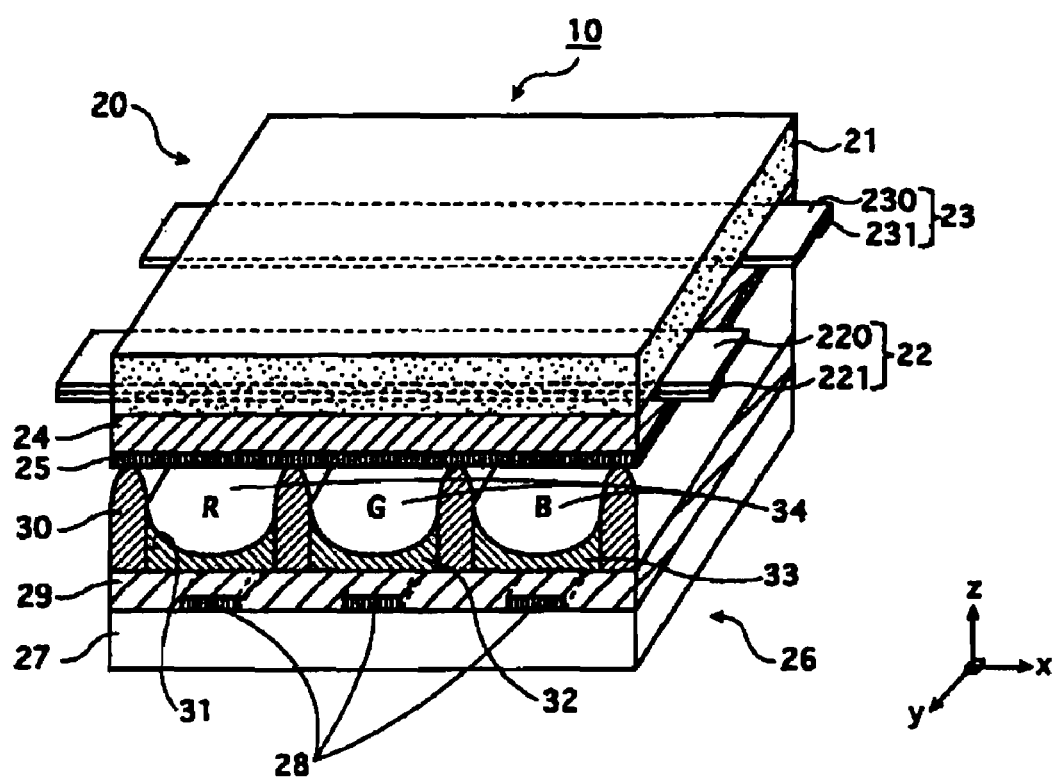

BLUE PHOSPHOR, LIGHT-EMITTING DEVICE, AND PLASMA DISPLAY PANEL

TECHNICAL FIELD

The present invention relates to a blue phosphor that is used in a plasma display panel (PDP), a mercury-free fluorescent lamp or the like, and to a light-emitting device (PDP in particular).

BACKGROUND ART

Various aluminate phosphors have been put to practical use as phosphors for energy-saving fluorescent lamps. Examples of blue phosphors include $(Ba,Sr)MgAl_{10}O_{17}$:Eu (BAM:Eu), and examples of green phosphors include $CeMgA_{11}O_{19}$:Tb and $BaMgA_{10}O_{17}$:Eu,Mn.

In recent years, BAM:Eu, which has high luminance under vacuum-ultraviolet excitation, has been used as a blue phosphor for PDPs.

However, when a light-emitting device using the blue phosphor BAM:Eu is driven for a long period of time, the luminance is degraded significantly. Hence, for use in a light-emitting device, particularly in a PDP, there is a strong demand for a phosphor that shows less luminance degradation even after the long-time driving.

The mechanism of luminance degradation of the blue phosphor BAM:Eu has not been clarified sufficiently. The luminance degradation of the blue phosphor is likely to occur because of the entry of moisture and impurity gas, and the heat treatment in the process of manufacturing the light-emitting device, and the vacuum ultraviolet light irradiation during driving of the light-emitting device.

In order to prevent the luminance degradation, there have been proposed a method in which gadolinium is added to a phosphor (see JP 6(1994)-29418 B, for example), a method in which a phosphor is coated with silicate of divalent metal such as alkaline earth metal (see JP 2000-34478 A, for example), and a method in which a phosphor is coated with an antimony oxide (see JP 10(1998)-330746 A, for example).

However, light-emitting devices using the phosphors according to these conventional methods, in most cases, cannot suppress the luminance degradation of the phosphor during driving while maintaining high luminance.

DISCLOSURE OF INVENTION

The present invention has achieved a solution to the above-mentioned conventional problems, and it is an object of the present invention to provide a blue phosphor that has high luminance and shows less luminance degradation during driving of the light-emitting device. It is a further object of the present invention to provide a long-life light-emitting device, particularly a PDP, using the blue phosphor.

The present invention is a blue phosphor including: an alkaline earth metal aluminate represented by a general formula $aBaO.bSrO.(1-a-b)EuO.cMgO.dAlO_{3/2}$, where $0.70 \leq a \leq 0.95$, $0 \leq b \leq 0.15$, $0.95 \leq c \leq 1.15$, $9.00 \leq d \leq 11.00$, and $a+b \leq 0.97$ are satisfied; and 0.008 mol to 0.800 mol of $MWO_4$ with respect to 1 mol of the aluminate, where M is at least one element selected from a group consisting of Ba, Sr, and Ca. Particularly, it is preferable that $0.80 \leq a \leq 0.95$, $0 \leq b \leq 0.05$, $1.00 \leq c \leq 1.15$, and $9.50 \leq d \leq 10.00$ are satisfied.

In another aspect, the present invention is a light-emitting device, having a phosphor layer including the blue phosphor. A preferable example of the light-emitting device is a plasma display panel.

The plasma display panel includes, for example: a front panel; a back panel that is arranged to face the front panel; barrier ribs that define a clearance between the front panel and the back panel; a pair of electrodes that are disposed on the back panel or the front panel; an external circuit that is connected to the electrodes; A discharge gas that is present at least between the electrodes and contains xenon that generates a vacuum ultraviolet ray by applying a voltage between the electrodes through the external circuit; and phosphor layers that emit visible light induced by the vacuum ultraviolet ray. The phosphor layers include a blue phosphor layer, and the blue phosphor layer contains the present phosphor.

The present invention can provide a blue phosphor that has high luminance and shows less luminance degradation during manufacturing and driving of the light-emitting device. The present invention also can provide a long-life light-emitting device, such as a PDP, having luminance that is not degraded even after long-time driving.

BRIEF DESCRIPTION OF THE DRAWINGS

FIG. 1 is a brief cross-sectional view showing a configuration of a PDP according to the present invention.

BEST MODE FOR CARRYING OUT THE INVENTION

Hereinafter, embodiments of the present invention will be described in detail. The blue phosphor of the present invention includes: an alkaline earth metal aluminate represented by the general formula $aBaO.bSrO.(1-a-b)EuO.cMgO.dAlO_{3/2}$, where $0.70 \leq a \leq 0.95$, $0 \leq b \leq 0.15$, $0.95 \leq c \leq 1.15$, $9.00 \leq d \leq 11.00$, and $a+b \leq 0.97$ are satisfied; and $MWO_4$, where M is at least one element selected from the group consisting of Ba, Sr, and Ca. The content of $MWO_4$ is 0.008 mol to 0.800 mol with respect to 1 mol of the alkaline earth metal aluminate. When the coefficients a, b, c, and d fall within the above-mentioned ranges, and the alkaline earth metal aluminate and $MWO_4$ are contained at the content ratio within the above-mentioned range, the resultant phosphor has high luminance and shows less luminance degradation during manufacturing and driving of the light-emitting device. From the viewpoint of luminance and resistance to luminance degradation, a preferable range of the coefficients a, b, c, and d is $0.80 \leq a \leq 0.95$, $0 \leq b \leq 0.05$, $1.00 \leq c \leq 1.15$, and $9.50 \leq d \leq 10.00$, respectively.

<Method for Producing the Blue Phosphor>

Hereinafter, an example of the method for producing the blue phosphor of the present invention will be described.

As a barium source material, a barium compound that can be converted into barium oxide by firing, such as barium hydroxide, barium carbonate, barium nitrate, barium halide, and barium oxalate, each having high purity (purity of 99% or more), may be used. Barium oxide having high purity (purity of 99% or more) also may be used.

As a strontium source material, a strontium compound that can be converted into strontium oxide by firing, such as strontium hydroxide, strontium carbonate, strontium nitrate, strontium halide, and strontium oxalate, each having high purity (purity of 99% or more), may be used. Strontium oxide having high purity (purity of 99% or more) also may be used.

As a calcium source material, a calcium compound that can be converted into calcium oxide by firing, such as calcium hydroxide, calcium carbonate, calcium nitrate, calcium halide, and calcium oxalate, each having high purity (purity of 99% or more), may be used. Calcium oxide having high purity (purity of 99% or more) also may be used.

As a europium source material, a europium compound that can be converted into europium oxide by firing, such as europium hydroxide, europium carbonate, europium nitrate, europium halide, and europium oxalate, each having high purity (purity of 99% or more), may be used. Europium oxide having high purity (purity of 99% or more) also may be used.

As a magnesium source material, a magnesium compound that can be converted into magnesium oxide by firing, such as magnesium hydroxide, magnesium carbonate, magnesium nitrate, magnesium halide, magnesium oxalate, and basic magnesium carbonate, each having high purity (purity of 99% or more), may be used. Magnesium oxide having high purity (purity of 99% or more) also may be used.

As an aluminum source material, an aluminum compound that is converted into alumina by firing, such as aluminum hydroxide, aluminum nitrate, and aluminum halide, each having high purity (purity of 99.9% or more), may be used. Alumina having high purity (purity of 99.9% or more) also may be used.

As a tungsten source material, various source materials that can be converted into oxides may be used in the same way.

In this example of the production method, an alkaline earth metal aluminate in which Eu is trivalent, and a tungsten composite oxide are prepared separately first. The alkaline earth metal aluminate is represented by the general formula $aBaO.bSrO.(1-a-b)EuO_{3/2}.cMgO.dAlO_{3/2}$, where $0.70 \leq a \leq 0.95$, $0 \leq b \leq 0.15$, $0.95 \leq c \leq 1.15$, $9.00 \leq d \leq 11.00$, and $a+b \leq 0.97$ are satisfied. The tungsten composite oxide is denoted as $MWO_4$, where M is at least one element selected from the group consisting of Ba, Sr, and Ca. (Hereinafter, the alkaline earth metal aluminate represented by $aBaO.bSrO.(1-a-b)EuO_{3/2}.cMgO.dAlO_{3/2}$ is referred to as an alkaline earth metal aluminate ($Eu^{3+}$), and an alkaline earth metal aluminate represented by $aBaO.bSrO.(1-a-b)EuO.cMgO.dAlO_{3/2}$ is referred to as an alkaline earth metal aluminate ($Eu^{2+}$).)

The alkaline earth metal aluminate ($Eu^{3+}$) is prepared by mixing, for example, the aforementioned barium source material, strontium source material, europium source material, magnesium source material, and aluminum source material so as to correspond to the desired composition (the desired coefficients a, b, c, and d) of the alkaline earth metal aluminate ($Eu^{2+}$), and firing the resultant mixture.

The method of mixing the source materials may be wet mixing in a solution or dry mixing of dry powders. A ball mill, a stirred media mill, a planetary mill, a vibration mill, a jet mill, a V-type mixer, an agitator and the like, which are in general industrial use, may be used. Since coarse particles in the source materials adversely affect the light-emitting property, it is preferable that the particles are classified to improve the particle size uniformity.

The firing is performed, for example, in air at 1000° C. to 1500° C. for 1 to 10 hours.

$MWO_4$ is prepared by mixing, for example, at least one selected from the aforementioned barium source material, strontium source material and calcium source material, with the tungsten source material so that the molar ratio of Ba+Sr+Ca and W is approximately 1:1, and firing the resultant mixture.

The method of mixing the source materials is the same as the above. The firing is performed, for example, in air at 1000° C. to 1500° C. for 1 to 10 hours.

When a hydroxide, a carbonate, a nitrate, a halide, an oxalate or the like that can be converted into oxide by firing is used as a source material, such a source material preferably is pre-fired at a temperature in the range of 800° C. to 1400° C. before undergoing the main firing. A flux, such as material fluoride, preferably is added in order to accelerate the reaction.

Next, the alkaline earth metal aluminate ($Eu^{3+}$) and $MWO_4$ thus obtained are mixed, and then reduction-fired.

As the mixing method, the same method as described above can be employed.

The reduction firing is performed in order to achieve fluorescent characteristics by reducing Eu from trivalent to divalent. The reduction firing is performed, for example, at 900° C. to 1600° C. under a reducing atmosphere for 1 to 50 hours. As the reducing atmosphere, an atmosphere containing 0.1% to 10% by volume of hydrogen can be mentioned, for example.

As a furnace used for the firing and reduction firing, a furnace that is in general industrial use may be used. A gas furnace or an electric furnace of batch type or continuous type such as a pusher furnace may be used.

The particle size distribution and flowability of the phosphor powder can be adjusted by crushing the obtained phosphor powder again using a ball mill, jet mill, or the like, and furthermore by washing or classification, if necessary.

The blue phosphor of the present invention is obtained by preparing the alkaline earth metal aluminate ($Eu^{3+}$) and $MWO_4$, mixing the alkaline earth metal aluminate ($Eu^{3+}$) and $MWO_4$, and reduction-firing the mixture, as mentioned above, for example. As a result, $aBaO.bSrO.(1-a-b)EuO.cMgO.dAlO_{3/2}$ and $MWO_4$ are dispersed in the blue phosphor. Thus, the blue phosphor of the present invention is different from the blue phosphor obtained by mixing the barium source material, strontium source material, (calcium source material), europium source material, magnesium source material, aluminum source material, and tungsten source material, and reduction-firing the mixture to form a composition of these elements. The blue phosphor of the present invention has higher luminance and higher resistance to luminance degradation than those of such a phosphor.

Another component may be present in the blue phosphor of the present invention as long as the alkaline earth metal aluminate ($Eu^{3+}$) and $MWO_4$ are contained at the predetermined ratio mentioned above. For example, the alkaline earth metal aluminate ($Eu^{3+}$) left unreduced may be present.

<Application of the Blue Phosphor>

Using the blue phosphor of the present invention in a light-emitting device having a phosphor layer makes it possible to construct a light-emitting device with high luminance and high resistance to luminance degradation. Specifically, in a light-emitting device having a phosphor layer in which BAM:Eu is used, BAM:Eu is replaced with the blue phosphor of the present invention, and a light-emitting device may be constructed according to a known method. Also, a light-emitting device can be constructed by using the phosphor of the present invention and a light emitting diode (LED) chip in combination. Preferable examples of the light-emitting device include a PDP, a fluorescence panel, and a fluorescent lamp. Among these, a PDP is suitable.

Hereinafter, an embodiment in which the blue phosphor of the present invention is applied to a PDP (the PDP of the present invention) will be described with an example of an AC surface-discharge type PDP. FIG. 1 is a cross-sectional perspective view showing a principal structure of an AC surface-discharge type PDP 10. It should be noted that the PDP shown here is illustrated for convenience' sake with a size that is appropriate for a specification of 1024×768 pixels, which is 42-inch class, and the present invention may be applied to other sizes and specifications as well.

As illustrated in FIG. 1, the PDP 10 includes a front panel 20 and a back panel 26, and these panels are arranged with their main surfaces facing each other.

The front panel 20 includes a front panel glass 21 as a front substrate, strip-shaped display electrodes (X-electrode 23, Y-electrode 22) provided on one main surface of the front panel glass 21, a front-side dielectric layer 24 having a thickness of about 30 μm covering the display electrodes, and a protective layer 25 having a thickness of about 1.0 μm provided on the front-side dielectric layer 24.

The above display electrode includes a strip-shaped transparent electrode 220 (230) with a thickness of 0.1 μm and a width of 150 μm, and a bus line 221 (231) having a thickness of 7 μm and a width of 95 μm and laid on the transparent electrode. A plurality of pairs of the display electrodes are disposed in the y-axis direction, where the x-axis direction is a longitudinal direction.

Each pair of display electrodes (X-electrode 23, Y-electrode 22) is connected electrically to a panel drive circuit (not shown) in the vicinity of the ends of the width direction (y-axis direction) of the front panel glass 21. It should be noted that the Y-electrodes 22 are connected collectively to the panel drive circuit and the X-electrodes 23 each are connected independently to the panel drive circuit. When the Y-electrodes 22 and the certain X-electrodes 23 are fed using the panel drive circuit, a surface discharge (sustained discharge) is generated in the gap (approximately 80 μm) between the X-electrode 23 and the Y-electrode 22. The X-electrode 23 also can operate as a scan electrode, and in this case, a write discharge (address discharge) can be generated between the X-electrode 23 and an address electrode 28 to be described later.

The above-mentioned back panel 26 includes a back panel glass 27 as a back substrate, a plurality of address electrodes 28, a back-side dielectric layer 29, barrier ribs 30, and phosphor layers 31 to 33, each of which corresponds to one color of red (R), green (G), and blue (B). The phosphor layers 31 to 33 are provided so that they contact with side walls of two adjacent barrier ribs 30 and with the back-side dielectric layer 29 between the adjacent barrier ribs 30, and repeatedly are disposed in sequence in the x-axis direction.

The blue phosphor layer (B) contains the above-mentioned blue phosphor of the present invention. On the other hand, the red phosphor layer and the green phosphor layer contain phosphors commonly used. Examples of a red phosphor include (Y,Gd)BO$_3$:Eu and Y$_2$O$_3$:Eu, and examples of a green phosphor include Zn$_2$SiO$_4$:Mn, YBO$_3$:Tb, and (Y,Gd)BO$_3$:Tb.

Each phosphor layer can be formed by applying a phosphor ink in which phosphor particles are dissolved to the barrier ribs 30 and the back-side dielectric layer 29 by a known applying method such as a meniscus method and a line jet method, and drying and firing them (e.g., at 500° C., for 10 minutes). The above-mentioned phosphor ink can be prepared, for example, by mixing 30% by mass of the blue phosphor having a volume average particle diameter of 2 μm, 4.5% by mass of ethyl cellulose with a weight average molecular weight of about 200,000, and 65.5% by mass of butyl carbitol acetate. In this regard, it is preferable that the viscosity thereof is adjusted eventually to about 2000 to 6000 cps (2 to 6 Pas), because the adherence of the ink to the barrier ribs 30 can be enhanced.

The address electrodes 28 are provided on the one main surface of the back panel glass 27. The back-side dielectric layer 29 is provided so as to cover the address electrodes 28. The barrier ribs 30 have a height of about 150 μm and a width of about 40 μm, and the longitudinal direction is in the y-axis direction. The barrier ribs 30 are provided on the back-side dielectric layer 29 so as to correspond to the pitch of the adjacent address electrodes 28.

Each of the address electrodes 28 has a thickness of 5 μm and a width of 60 μm. A plurality of address electrodes 28 are disposed in the x-axis direction, where the y-axis direction is a longitudinal direction. The address electrodes 28 are disposed at a certain pitch (about 150 μm). A plurality of address electrodes 28 each are connected independently to the above-mentioned panel drive circuit. Address discharge can be generated between a certain address electrode 28 and a certain X-electrode 23 by feeding each address electrode individually.

The front panel 20 and the back panel 26 are disposed so that the address electrode 28 and the display electrode are orthogonal to each other. The peripheral portions of both the panels 20 and 26 are bonded and sealed with a frit glass sealing portion (not shown) that serves as a sealing member.

An enclosed space between the front panel 20 and the back panel 26, which has been bonded and sealed with the frit glass sealing portion, is filled with a discharge gas composed of a rare gas such as He, Xe and Ne at a predetermined pressure (ordinarily about $6.7 \times 10^4$ to $1.0 \times 10^5$ Pa).

It should be noted that a space corresponding to a space between two adjacent barrier ribs 30 is a discharge space 34. A region where a pair of display electrodes and one address electrode 28 intersect with the discharge space 34 in between corresponds to a cell used for displaying images. It should be noted that in this embodiment, the cell pitch in the x-axis direction is set to approximately 300 μm and the cell pitch in the y-axis direction is set to approximately 675 μm.

When the PDP 10 is driven, a sustained discharge is generated by applying a pulse to between a pair of the display electrodes (X-electrode 23, Y-electrode 22) after an address discharge is generated by applying a pulse voltage to the certain address electrode 28 and the certain X-electrode 23 by the panel drive circuit. The phosphors contained in the phosphor layers 31 to 33 are allowed to emit visible light using the ultraviolet ray with a short wavelength (a resonance line with a central wavelength of about 147 nm and a molecular beam with a central wavelength of 172 nm) thus generated. Thereby, a prescribed image can be displayed on the front panel side.

The blue phosphor of the present invention can be applied to a fluorescent panel including a fluorescent layer that is excited by an ultraviolet ray and then emits light according to a known manner. This fluorescent panel has a good luminance as well as an excellent resistance to luminance degradation compared to the conventional fluorescent panels. This fluorescent panel can be used, for example, as a backlight of a liquid crystal display device.

The blue phosphor of the present invention can be applied also to a fluorescent lamp (for example, an electrodeless fluorescent lamp, a xenon fluorescent lamp, and a fluorescent mercury lamp) according to a known manner. This fluorescent lamp has a good luminance as well as an excellent resistance to luminance degradation compared to the conventional fluorescent lamps.

EXAMPLE

Hereinafter, an embodiment of the present invention will be described in more detail with reference to the Example. The present invention is not limited thereby.

<Preparation of Phosphor Samples Used in Example>

As the starting materials of the alkaline earth metal aluminate, $BaCO_3$, $SrCO_3$, $MgCO_3$, $Al_2O_3$, $AlF_3$, and $Eu_2O_3$ were used. These were weighed according to a predetermined composition, and wet-mixed in pure water using a ball mill. The mixture was dried, and then fired in air at 1200° C. to 1500° C. for 4 hours to obtain an alkaline earth metal aluminate ($Eu^{3+}$).

Next, as the starting materials of the tungsten composite oxide, $BaCO_3$, $SrCO_3$, $CaCO_3$, and $WO_3$ were used. These were weighed according to a predetermined composition, and wet-mixed in pure water using a ball mill. The mixture was dried, and then fired in air at 1000° C. to 1500° C. for 4 hours.

Then, the alkaline earth metal aluminate ($Eu^{3+}$) and the tungsten composite oxide were weighed according to the compositions shown in Table 1, and wet-mixed in pure water using a ball mill. The mixtures were dried, and then reduction-fired in nitrogen containing 3% by volume of hydrogen at 1200° C. to 1500° C. for 4 hours to obtain phosphors (Samples No. 4 to 14). At the stage of lowering the temperature, the introduction of hydrogen is stopped at a temperature of 800° C. to 1000° C. to raise the oxygen partial pressure in the mixed gas.

<Preparation of Phosphor Samples as Comparative Examples>

In order to prepare Samples No. 1 to 3 and Sample No. 15, $BaCO_3$, $SrCO_3$, $MgCO_3$, $Al_2O_3$, $AlF_3$, and $Eu_2O_3$ were used. These were weighed according to a predetermined composition, and wet-mixed in pure water using a ball mill. The mixture was dried, and then fired in nitrogen containing 3% by volume of hydrogen at 1200° C. to 1500° C. for 4 hours to obtain phosphors. Sample No. 16 was prepared through the same procedures as those for preparing the phosphor samples of the Example.

<Measurement of Luminance>

The luminances were obtained by irradiating the phosphors with vacuum ultraviolet light at a wavelength of 146 nm in a vacuum and measuring the light emissions in the visible region. The luminance is a luminance Y in the XYZ color coordinate system of International Commission on Illumination, and was evaluated as a relative value with respect to the standard sample BAM:Eu ($Ba_{0.9}MgAl_{10}O_{17}:Eu_{0.1}$). Table 1 shows the results and compositions of the samples. The samples with an asterisk in Table 1 are comparative examples.

TABLE 1

| Sample No. | a | b | c | d | M | $MWO_4$ (mol) | Luminance Y (%) |
|---|---|---|---|---|---|---|---|
| *1 | 0.65 | 0.25 | 0.90 | 8.00 | | 0 | 65 |
| *2 | 0.70 | 0.20 | 1.00 | 10.00 | | 0 | 90 |
| *3 | 0.97 | 0 | 1.20 | 12.00 | | 0 | 70 |
| 4 | 0.70 | 0.15 | 0.95 | 9.00 | Ca | 0.008 | 102 |
| 5 | 0.90 | 0.05 | 1.15 | 10.00 | Sr | 0.800 | 105 |
| 6 | 0.90 | 0.05 | 1.15 | 11.00 | Ba | 0.080 | 105 |
| 7 | 0.85 | 0.05 | 1.00 | 9.50 | $Sr_{1/2}Ba_{1/2}$ | 0.040 | 118 |
| 8 | 0.80 | 0.05 | 1.15 | 10.00 | Sr | 0.160 | 114 |
| 9 | 0.90 | 0 | 1.00 | 10.00 | Ba | 0.080 | 116 |
| 10 | 0.90 | 0.02 | 1.15 | 9.70 | Sr | 0.080 | 118 |
| 11 | 0.80 | 0.05 | 1.00 | 9.50 | Sr | 0.080 | 119 |
| 12 | 0.95 | 0 | 1.00 | 10.00 | Ba | 0.160 | 111 |
| 13 | 0.91 | 0 | 1.00 | 10.00 | Ba | 0.070 | 120 |
| 14 | 0.90 | 0 | 1.00 | 9.80 | Ba | 0.040 | 116 |
| *15 | 0.80 | 0.10 | 1.00 | 12.00 | | 0 | 92 |
| *16 | 0.80 | 0.10 | 1.00 | 10.00 | Ca | 1.600 | 85 |

The values of $MWO_4$ indicate the contents with respect to 1 mol of alkaline earth metal aluminate ($Eu^{3+}$).

As is clear from Table 1, the phosphors of Samples No. 4 to 14, which are the blue phosphors of the present invention, exhibit high luminance under vacuum-ultraviolet excitation.

<Panel Luminance and Luminance Degradation>

PDPs having the configuration of FIG. 1 were manufactured according to the configuration of the above-described example of an AC surface-discharge type PDP, using the blue phosphors obtained in the same ways as in Samples No. 1 to 16. The panel initial luminances (as a relative value with respect to the standard sample BAM:Eu) were measured on the PDPs thus manufactured. The luminance after accelerated driving (equivalent to 1000 hours of actual driving) was measured to calculate luminance degradation (%). The panels displayed a fixed image with one color of blue. Table 2 shows the results. The samples with an asterisk in Table 2 are comparative examples.

TABLE 2

| Sample No. | a | b | c | d | M | $MWO_4$ (mol) | Luminance (%) | Luminance degradation (%) |
|---|---|---|---|---|---|---|---|---|
| *17 | 0.65 | 0.25 | 0.90 | 8.00 | | 0 | 60 | 12 |
| *18 | 0.70 | 0.20 | 1.00 | 10.00 | | 0 | 82 | 15 |
| *19 | 0.97 | 0 | 1.20 | 12.00 | | 0 | 65 | 16 |
| 20 | 0.70 | 0.15 | 0.95 | 9.00 | Ca | 0.008 | 100 | 8 |
| 21 | 0.90 | 0.05 | 1.15 | 10.00 | Sr | 0.800 | 101 | 6 |
| 22 | 0.90 | 0.05 | 1.15 | 11.00 | Ba | 0.080 | 102 | 5 |
| 23 | 0.85 | 0.05 | 1.00 | 9.50 | $Sr_{1/2}Ba_{1/2}$ | 0.040 | 114 | 3 |
| 24 | 0.80 | 0.05 | 1.15 | 10.00 | Sr | 0.160 | 111 | 5 |
| 25 | 0.90 | 0 | 1.00 | 10.00 | Ba | 0.080 | 114 | 3 |
| 26 | 0.90 | 0.02 | 1.15 | 9.70 | Sr | 0.080 | 115 | 2 |
| 27 | 0.80 | 0.05 | 1.00 | 9.50 | Sr | 0.080 | 116 | 3 |
| 28 | 0.95 | 0 | 1.00 | 10.00 | Ba | 0.160 | 114 | 6 |
| 29 | 0.91 | 0 | 1.00 | 10.00 | Ba | 0.070 | 118 | 1 |
| 30 | 0.90 | 0 | 1.00 | 9.80 | Ba | 0.040 | 114 | 2 |
| *31 | 0.80 | 0.10 | 1.00 | 12.00 | | 0 | 88 | 16 |
| *32 | 0.80 | 0.10 | 1.00 | 10.00 | Ca | 1.600 | 85 | 11 |

As is clear from Table 2, it is confirmed that use of Samples No. 20 to 30, which are the blue phosphors of the present invention, increased the initial luminances of the panels and suppressed significantly the luminance degradation. In contrast, use of the comparative examples, in which at least one of the coefficients a, b, c, and d, and the $MWO_4$ content is outside the respective range specified in the present invention, lowered the initial luminance and caused significant luminance degradation during driving of the PDP.

INDUSTRIAL APPLICABILITY

The blue phosphor of the present invention can be used in light-emitting devices, particularly in PDPs. Also, the blue phosphor of the present invention can be applied to applications such as a fluorescent lamp like an electrodeless fluorescent lamp, a xenon fluorescent lamp, and a fluorescent mercury lamp, and a fluorescent panel to be used mainly for a backlight of a liquid crystal display device.

The invention claimed is:

1. A blue phosphor comprising: an alkaline earth metal aluminate represented by a general formula $aBaO.bSrO.(1-a-b)EuO.cMgO.dAlO_{3/2}$, where $0.70 \leqq a \leqq 0.95$, $0 \leqq b \leqq 0.15$, $0.95 \leqq c \leqq 1.15$, $9.00 \leqq d \leqq 11.00$, and $a+b \leqq 0.97$ are satisfied; and 0.008 mol to 0.800 mol of $MWO_4$ with respect to 1 mol of the aluminate, where M is at least one element selected from a group consisting of Ba and Sr.

2. The blue phosphor according to claim 1, wherein $0.80 \leqq a \leqq 0.95$, $0 \leqq b \leqq 0.05$, $1.00 \leqq c \leqq 1.15$, and $9.50 \leqq d \leqq 10.00$ are satisfied.

3. A light-emitting device, comprising a phosphor layer including the blue phosphor according to claim 1.

4. The light-emitting device according to claim 3, which is a plasma display panel.

5. The light-emitting device according to claim 4,
wherein the plasma display panel comprises:
a front panel;
a back panel that is arranged to face the front panel;
barrier ribs that define a clearance between the front panel and the back panel;
a pair of electrodes that are disposed on the back panel or the front panel;
an external circuit that is connected to the electrodes;
a discharge gas that is present at least between the electrodes and contains xenon that generates a vacuum ultraviolet ray by applying a voltage between the electrodes through the external circuit; and
phosphor layers that emit visible light induced by the vacuum ultraviolet ray,
the phosphor layers include a blue phosphor layer, and
the blue phosphor layer contains the blue phosphor.

\* \* \* \* \*